Oct. 5, 1954 J. R. SHERWOOD ET AL 2,691,132

MAGNITUDE AND PHASE METER

Filed June 7, 1950

INVENTOR.

JOHN R. SHERWOOD

STUART M. MORRISON

BY [illegible]

Atty.

Patented Oct. 5, 1954 2,691,132

UNITED STATES PATENT OFFICE 2,691,132

MAGNITUDE AND PHASE METER

John R. Sherwood and Stuart M. Morrison, Cedar Rapids, Iowa, assignors to Collins Radio Company, Cedar Rapids, Iowa, a corporation of Iowa Application June 7, 1950, Serial No. 166,660

3 Claims. (Cl. 324—57)

This invention relates in general to measuring apparatus, and in particular to a circuit which will indicate the phase relation between current and voltage and also the impedance of a load.

To obtain maximum power transfer, it is desirable to match the impedance of the generator to the impedance of the load. In a radio transmitter, for example, the power is usually supplied to an antenna which radiates the energy. It is desirable, therefore, to match the impedance of the transmitter to the impedance of the antenna. It is very convenient to have a system which automatically makes the impedance match.

Suppose, for example, that a radio transmitter is designed to operate at a plurality of frequencies between 5 and 20 megacycles. The impedance of the antennae changes with frequency because of its fixed physical dimensions and thus inductance or capacitance must be added to the antennae with a suitable antennae matching circuit. The addition of capacitance, inductance, or resistance may be done manually, or automatically by a suitable servo mechanism. There must be, however, some means of knowing when the matched condition exists.

It is an object of this invention, therefore, to provide a circuit which compares impedance.

Yet another object of this invention is to provide means for indicating the phase relationship between current and voltage.

Yet another object of this invention is to obtain maximum efficiency by matching the load and generator impedances.

A feature of this invention is found in the provision for a phase measuring circuit which gives an output proportional to the phase relationship between current and voltage and also gives an output proportional to the magnitude of the load impedance. When the voltage and current are in phase and the impedance of the load matched to that of the generator, maximum power transfer will occur.

Figure 2:
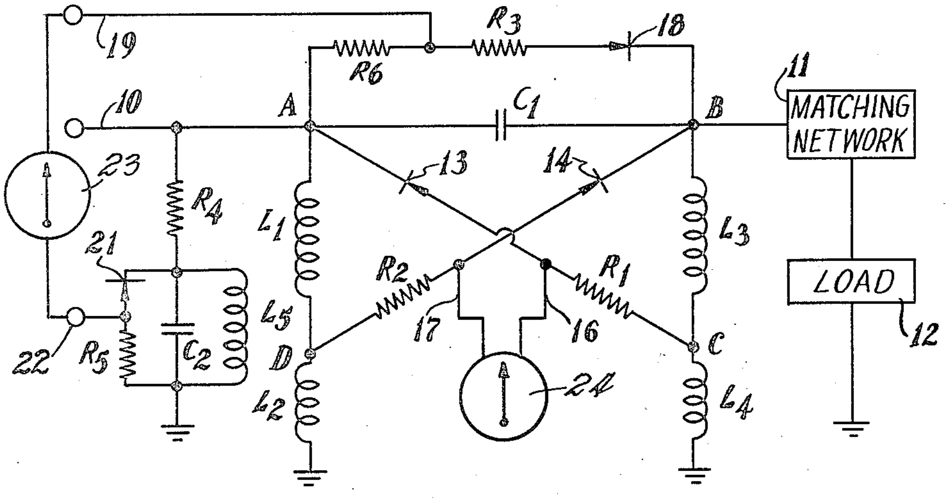
Figure 1:
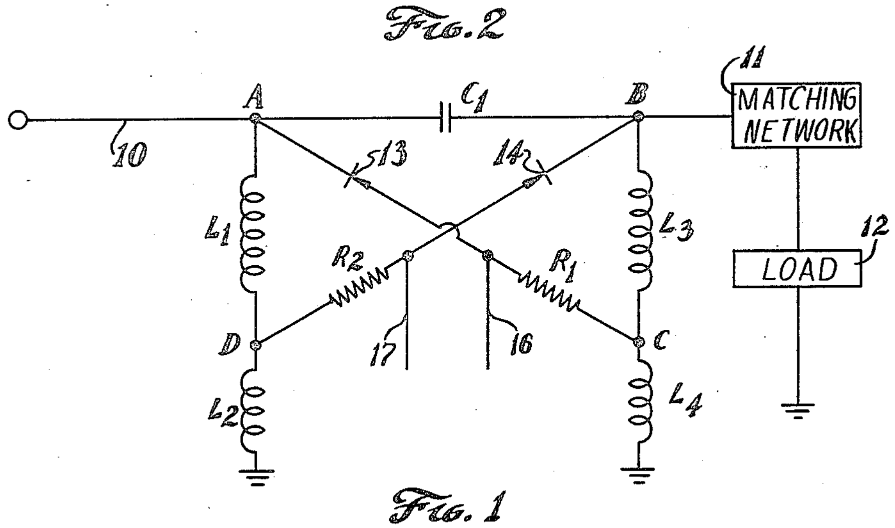
Figure 3:
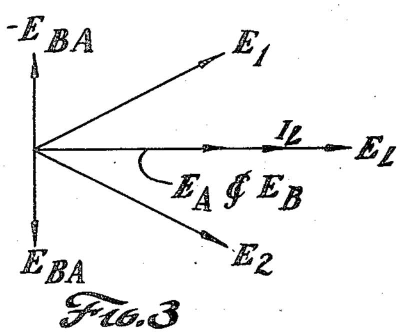
Figure 4:
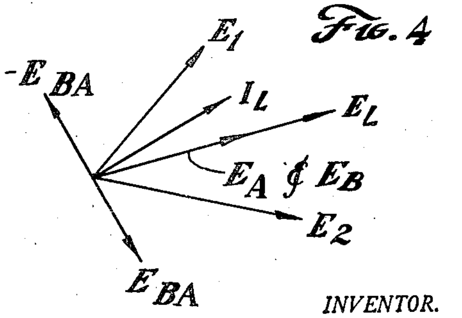

Further objects, features, and advantages of this invention will become apparent from the following description and claims when read in view of the drawings, in which:

Figure 1 is a schematic diagram of the phase measuring portion of this invention, Figure 2 is a schematic diagram of the impedance measuring and phase measuring circuits, Figure 3 is a vector diagram showing the relationships when line current and line voltage are in phase; and, Figure 4 is a vector diagram showing the relationship when the line current leads the line voltage.

Figure 1 illustrates a phase measuring circuit comprising, an input lead 10, and a condenser $C_1$ connected in series to an impedance matching network 11. A load 12, which may be, for example, an antenna is connected to the network 11. Connected to one side of the condenser $C_1$ is a first inductance $L_1$ which is connected in series with a second inductance $L_2$. A pair of inductances $L_3$ and $L_4$ are connected in series between the opposite side of the condenser $C_1$ and ground. A first rectifier 13 which may be of the germanium type, is connected to one side of condenser $C_1$ (point A) and is in series with a resistor $R_1$ which is attached to point C between the inductances $L_3$ and $L_4$. A second diode rectifier 14 is connected in series with a resistor $R_2$ between points B and D. The impedance of $L_1$ is approximately one-twentieth of the impedance between point A and ground. Likewise, the impedance of $L_3$ is approximately one-twentieth of the impedance between point B and ground. The impedance of $C_1$ is low and may be in the order of 2½ to 5 ohms in the desired frequency range. It is desirable to make the impedance of $C_1$ less than ten percent of the tuned load impedance. The impedance to ground from points A and B may be in the order of 1,000 ohms with one-twentieth of the drop being across $L_1$ and $L_3$, respectively. The circuit should be symmetrical with $L_1$ and $L_3$ equal.

A first takeoff lead 16 is attached between the diode 13 and the resistor $R_1$. Likewise, a second lead 17 is attached between diode 14 and the resistor $R_2$.

Figure 3 illustrates the vector diagram for the phase portion of this invention when the line current and line voltage are in phase. The line current is designated by $I_L$ and the line voltage by $E_L$. The voltage $E_A$ between A and D and $E_B$, between B and C are substantially in phase due to the small impedance of $C_1$, and are made equal in magnitude because $L_1$ and $L_3$ have equal impedances. The voltage between points B and A is due to the line current $I_L$ and capacitor $C_1$. It will lag the line current by 90 degrees. If a voltmeter is connected between A and C it will read the vector sum of $E_{BA}$ and $E_B$ or $E_2$ in Figure 3. If a second voltmeter is connected between B and D it will read the vector sum of $E_A$ and the negative of $E_{BA}$ or $E_1$.

It is to be noticed that if the current $I_L$ is in phase with the voltage $E_L$ that $E_1$ and $E_2$ are equal.

Figure 4 is a vector diagram for the condition when $I_L$ leads $E_L$. It is noted that $E_2$ is larger than $E_1$. Likewise, if $I_L$ lags $E_L$, $E_1$ will be greater than $E_2$.

If a suitable servo system received outputs from leads 16 and 17 and actuated the impedance matching network 11 until they were equal, the line current would be in phase with the line voltage. Servo systems are well known to those skilled in the art and will not be described in detail herein. Thus, this invention has provided a phase comparison circuit.

Figure 2 illustrates the phase measuring apparatus of this invention combined with means for comparing impedance. A rectifier 18 is connected in series with a pair of resistors $R_3$ and $R_6$ between points B and A. A lead 19 is connected between the resistor $R_3$ and resistor $R_6$ and the output gives an indication of the voltage across condenser $C_1$. A resistor $R_4$ is connected to point A and is in series with a parallel combination of an inductance $L_5$, capacitor $C_2$, and a series connected rectifier 21 and resistance $R_5$. The opposite side of the parallel branch is connected to ground. A lead 22 removes an output from the rectifier 21 to give an output proportional to the voltage across $C_2$. The output from lead 19 is proportional to the line current $I_L$, and the reading from lead 22 is proportional to the line voltage $E_L$. If a load resistance of known value as, for example, fifty ohms, is connected in place of network 11 and load 12, and the value of $C_2$ adjusted until the outputs from leads 19 and 22 are equal, then the impedance of any load may be compared with fifty ohms. If the impedance of the load is more than fifty ohms, the line current will decrease and thus the voltage across $C_1$ will be less than the voltage across $C_2$. Then the output from lead 22 will be greater than the output from lead 19. Likewise, if the impedance of the load is less than fifty ohms, the line current will go up and the line voltage down, so that the voltage across condenser $C_2$ will be less than the voltage across condenser $C_1$. A suitable servo system may receive the outputs across condenser $C_1$ and $C_2$, respectively, and be connected to the network 11 to vary the impedance of the load until the voltages across $C_1$ and $C_2$ are equal and the generator will then see fifty ohms. Fifty ohms is a standard impedance of a generator, but any suitable value may be used. It is to be noted that the impedance of this invention is included in the fifty ohm impedance. A voltmeter 24 may be connected to leads 16 and 17 to indicate the difference in amplitude between $e_1$ and $e_2$. A second voltmeter 23 may be connected between terminals 19 and 22 to indicate the relative impedance of the load.

Likewise, the output from the phase comparison circuit may be furnished to a suitable servo system to adjust the capacitive or inductive reactance of the load until the phase angle is zero. Alternatively, the adjustment may be made manually by observing on a meter the various voltages.

It is seen that this invention provides means for matching impedances. The inductances $L_1$, $L_2$, $L_3$, and $L_4$ may be replaced by capacitors or resistors, as they are voltage dividers, but applicants prefer inductances in the 2 to 25 megacycle range for the reason that the inductance has a tendency to counteract stray capacitance always present at these frequencies. The apparatus of this invention has been used as part of an automatic antenna matching device for a transmitter which is tunable between 2 and 25 megacycles in four banks of frequencies.

Values of components may be, for example:

| | | |
|---|---|---|
| $C_1$ | microfarads | 0.014 |
| $L_1=L_3$ | microhenries | 4 |
| $L_2=L_4$ | do | 80 |
| $R_1=R_2$ | ohms | 5600 |
| $R_3$ | do | 4700 |
| $R_4$ | do | 2500 |
| $R_5$ | do | 5600 |
| $R_6$ | do | 1000 |
| $C_2$ | micromicrofarads | 470 |
| $L_2$ | microhenries | 150 |

It is to be understood that each diode crystal has a bypass condenser connected in parallel with it so as to filter out the radio frequency signals and thus give a clear indication of direct current voltage.

The phase measuring portion of this invention may be changed from a pi to a T network in a well known manner, and the broad principles of the invention will continue to operate as described with respect to the pi network.

Although this invention has been described with respect to particular embodiments thereof, it is not to be so limited as changes and modifications may be made therein which are within the full intended scope, as defined by the appended claims.

We claim:

1. A generator-load mismatch detector comprising a pair of conductors for interconnecting a generator and an electrical load, a series reactive impedance connected in one of said conductors for developing a first voltage thereacross which is in phase quadrature with the current in said one conductor, a first shunt impedance network symmetrically connected with respect to said series impedance between said conductors for developing a second voltage proportional to the voltage between said conductors, a detector circuit having a first and a second series branch, each branch including a rectifier and an output resistor, the first corresponding ends of said branches connected to opposite terminals of said series reactive impedance, the second corresponding ends of said branches connected to equal voltage points on said first shunt impedance network, said first series branch deriving a rectified voltage proportional to the vector sum of said first and second voltages, said second series branch deriving a rectified voltage proportional to the vector difference of said first and second voltages, a first pair of output terminals connected respectively to corresponding terminals of said output resistors for providing an output voltage proportional to phase relation of the voltage between said conductors and current in said one conductor; a rectifying circuit connected across said series reactive impedance, a second pair of output terminals connected respectively to said rectifying circuit and to an intermediate point on a second shunt impedance network, said second shunt impedance network including a variable impedance whereby the voltage between said second pair of output terminals is initially adjusted to zero for a given load impedance value, said second pair of output terminals providing an output voltage proportional to a change of load impedance from said given value.

2. A phase measuring means comprising, a condenser connected in series in a conductor, a first pair of inductors connected between ground and one side of said condenser, a second pair of inductors connected between ground and the other side of said condenser, a first diode rectifier connected between the first side of said condenser and the junction of said second pair of inductors, a second diode rectifier connected between the second side of said condenser and the junction of the first pair of inductors, and a voltmeter with one terminal connected to the first diode rectifier and the other terminal connected to the second diode rectifier.

3. Means for simultaneously measuring impedance and phase comprising, a line connected between input and output circuits, a first condenser connected in series with said line, a first pair of impedances connected between one side of said condenser and ground, a second pair of impedances connected between the opposite side of said condenser and ground, a first resistor, a first diode rectifier connected in series with said first resistor between said one side of said condenser and to a point between the second pair of impedances, a second resistor, a second diode detector connected in series with said second resistor and connected between said opposite side of said condenser and the junction of said first pair of impedances, a first voltmeter with its terminals connected, respectively, to the first and second diode rectifiers, third and fourth resistors, a third diode detector connected in a series branch with said third and fourth resistors and said series branch connected across said first condenser, a series parallel circuit comprising, respectively, a second condenser, an inductance, and a fifth resistor in series with a fourth diode, a sixth resistor connected in series with said series parallel circuit between said one side of said first condenser and ground, and a second voltmeter with one of its terminals connected between the third and fourth resistors and its other terminal connected between the fourth diode rectifier and said fifth resistor.

References Cited in the file of this patent

UNITED STATES PATENTS

| Number | Name | Date |
|---|---|---|
| 2,220,098 | Guanella | Nov. 5, 1940 |
| 2,264,723 | Schirp | Dec. 2, 1941 |
| 2,302,230 | Livingston | Nov. 17, 1942 |
| 2,313,699 | Roberts | Mar. 9, 1943 |
| 2,449,739 | Duttera | Sept. 21, 1948 |
| 2,499,182 | Dyson | Feb. 28, 1950 |
| 2,524,515 | Chapman | Oct. 3, 1950 |